United States Patent
Kitagishi et al.

(10) Patent No.: US 9,340,681 B2
(45) Date of Patent: May 17, 2016

(54) RESIN FILM AND METHOD OF PRODUCING RESIN FILM

(71) Applicant: NITTO DENKO CORPORATION, Ibaraki-shi, Osaka (JP)

(72) Inventors: Hitoshi Kitagishi, Ibaraki (JP); Satoru Kunikata, Ibaraki (JP); Minoru Miyatake, Ibaraki (JP)

(73) Assignee: NITTO DENKO CORPORATION, Ibaraki-shi (JP)

(*) Notice: Subject to any disclaimer, the term of this patent is extended or adjusted under 35 U.S.C. 154(b) by 0 days.

(21) Appl. No.: 13/970,688

(22) Filed: Aug. 20, 2013

(65) Prior Publication Data

US 2014/0065364 A1 Mar. 6, 2014

(30) Foreign Application Priority Data

Sep. 3, 2012 (JP) .................................. 2012-192966

(51) Int. Cl.
| | | |
|---|---|---|
| *C09D 5/00* | (2006.01) | |
| *B05D 3/12* | (2006.01) | |
| *C08J 7/00* | (2006.01) | |
| *C08J 7/04* | (2006.01) | |

(52) U.S. Cl.
CPC .. *C09D 5/00* (2013.01); *B05D 3/12* (2013.01); *C08J 7/047* (2013.01); *C08J 2375/04* (2013.01); *Y10T 428/24355* (2015.01)

(58) Field of Classification Search
CPC ................ C08J 7/06; C09D 5/00; B05D 3/12
USPC ........................................... 428/141; 427/171
See application file for complete search history.

(56) References Cited

U.S. PATENT DOCUMENTS

| | | |
|---|---|---|
| 5,281,472 A | 1/1994 | Takahashi et al. |
| 5,391,472 A | 2/1995 | Muys et al. |
| 6,225,040 B1 | 5/2001 | Muys et al. |
| 8,029,884 B2 | 10/2011 | Miyazaki et al. |
| 8,314,987 B2 | 11/2012 | Goto et al. |
| 8,320,042 B2 | 11/2012 | Goto et al. |
| 8,379,169 B2 | 2/2013 | Kitagawa et al. |
| 8,411,360 B2 | 4/2013 | Kitagawa et al. |

(Continued)

FOREIGN PATENT DOCUMENTS

| | | |
|---|---|---|
| CN | 1661395 A | 8/2005 |
| CN | 101506691 A | 8/2009 |

(Continued)

OTHER PUBLICATIONS

Japanese Explanation of Circumstances Concerning Accelerated Examination dated Feb. 4, 2014 for Japanese Patent Application No. 2013-040584 (corresponding to U.S. Appl. No. 14/169,270) with English translation (8 pages).

(Continued)

*Primary Examiner* — Nathan Van Sell
(74) *Attorney, Agent, or Firm* — Westerman, Hattori, Daniels & Adrian, LLP

(57) ABSTRACT

A resin film according to an embodiment of the present invention includes: a substrate film; and an antistatic layer formed on one side of the substrate film and including a binder resin and a conductive material. The binder resin includes a polyurethane-based resin; the antistatic layer has an arithmetic average surface roughness Ra of 10 nm or more; and the conductive material includes a conductive polymer.

8 Claims, 1 Drawing Sheet

(56) References Cited

U.S. PATENT DOCUMENTS

| | | |
|---|---|---|
| 8,485,673 B2 | 7/2013 | Furui et al. |
| 8,520,169 B2 | 8/2013 | Kitagawa et al. |
| 8,520,171 B2 | 8/2013 | Kitagawa et al. |
| 8,709,567 B2 | 4/2014 | Kitagawa et al. |
| 8,721,816 B2 | 5/2014 | Kitagawa et al. |
| 8,771,454 B2 | 7/2014 | Goto et al. |
| 2006/0047030 A1* | 3/2006 | Yoshida et al. ............... 524/99 |
| 2007/0166523 A1 | 7/2007 | Fukaya et al. |
| 2007/0202297 A1* | 8/2007 | Takada et al. ............... 428/141 |
| 2008/0044674 A1* | 2/2008 | Inoue et al. ............... 428/480 |
| 2008/0311385 A1 | 12/2008 | Miyazaki et al. |
| 2009/0015926 A1* | 1/2009 | Iwata et al. ............... 359/601 |
| 2009/0056589 A1* | 3/2009 | Guiheen et al. ............... 106/285 |
| 2009/0142562 A1 | 6/2009 | Miyagawa et al. |
| 2009/0168168 A1 | 7/2009 | Nakashima et al. |
| 2010/0003508 A1* | 1/2010 | Arrouy et al. ............... 428/336 |
| 2010/0028693 A1* | 2/2010 | Okafuji et al. ............... 428/423.7 |
| 2010/0035031 A1 | 2/2010 | Itoh et al. |
| 2010/0097705 A1 | 4/2010 | Furui et al. |
| 2010/0157216 A1 | 6/2010 | Wada |
| 2011/0268935 A1 | 11/2011 | Suzuki et al. |
| 2011/0315306 A1 | 12/2011 | Goto et al. |
| 2012/0003400 A1 | 1/2012 | Nishimura et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0315465 A1 | 12/2012 | Kawasaki et al. |
| 2013/0100529 A1 | 4/2013 | Kitagawa et al. |
| 2013/0114139 A1 | 5/2013 | Kitagawa et al. |
| 2013/0128357 A1 | 5/2013 | Izaki et al. |
| 2013/0299070 A1 | 11/2013 | Kawamura |
| 2014/0186568 A1 | 7/2014 | Kitagawa et al. |

FOREIGN PATENT DOCUMENTS

| | | |
|---|---|---|
| CN | 101937113 A | 1/2011 |
| EP | 1253166 A2 | 10/2002 |
| JP | 03-121843 A | 5/1991 |
| JP | 2000-168015 A | 6/2000 |
| JP | 2001-343521 A | 12/2001 |
| JP | 200741598 A | 2/2007 |
| JP | 201026523 A | 2/2010 |
| JP | 201060643 A | 3/2010 |
| JP | 201181399 A | 4/2011 |
| JP | 2012133303 A | 7/2012 |
| JP | 2012134117 A | 7/2012 |
| JP | 2013222125 A | 10/2013 |
| KR | 10-2008-0106864 A | 12/2008 |
| KR | 10-2012-0123328 A | 11/2012 |
| WO | 2007114179 A1 | 10/2007 |
| WO | 2009084832 A2 | 7/2009 |
| WO | 2010092926 A1 | 8/2010 |
| WO | 2011125958 A1 | 10/2011 |
| WO | 2012029937 A1 | 3/2012 |
| WO | 2012077824 A1 | 6/2012 |

OTHER PUBLICATIONS

Japanese Office Action dated May 21, 2014 issued in Japanese Patent Application No. 2013-040584 (corresponding to U.S. Appl. No. 14/169,270) with English translation (16 pages).

Extended European Search Report dated Apr. 24, 2014 issued in European Patent Application No. 14152821.6-1308 (5 pages) (corresponding to U.S. Appl. No. 14/169,270).

US Office Action dated Oct. 1, 2014, issued in U.S. Appl. No. 14/169,270 (26 pages).

US Office Action dated Aug. 21, 2014, issued U.S. Appl. No. 13/970,681 (10 pages).

Non-Final Office Action dated Jun. 1, 2015, issued in U.S. Appl. No. 14/169,270 (25 pages).

Office Action dated Sep. 8, 2015, issued in counterpart Chinese Patent Application No. 201410073899.X w/English translation (12 pages).

Taiwanese Office Action dated Jan. 27, 2015, issued in corresponding TW Patent Application No. 103103503 with English translation (Corresponds to U.S. Appl. No. 14/169,270) (9 pages).

Office Action dated Mar. 19, 2015, issued in Korean Patent Application No. 10-2014-0024211, with English translation (Corresponds to U.S. Appl. No. 14/169,270) (19 pages).

U.S. Office Action dated Apr. 21, 2015, issued in U.S. Appl. No. 13/970,681 (16 pages).

Office Action dated Mar. 23, 2016, issued in Japanese Patent Application No. 2012-192966 with English translation (20 pages).

* cited by examiner

RESIN FILM AND METHOD OF PRODUCING RESIN FILM

This application claims priority under 35 U.S.C. Section 119 to Japanese Patent Application No. 2012-192966 filed on Sep. 3, 2012, which is herein incorporated by reference.

BACKGROUND OF THE INVENTION

1. Field of the Invention

The present invention relates to a resin film and a method of producing such a resin film.

2. Description of the Related Art

A resin film is used in a wide range of applications because it is excellent in processability and a great variety of characteristics can be imparted thereto. For example, the resin film is used as a substrate on which a functional layer appropriate for each of various applications is formed. As a specific example thereof, there is proposed a method of producing a polarizing film, involving: forming a polyvinyl alcohol (PVA)-based resin layer on a resin film; stretching the laminate; and immersing the stretched laminate in a dyeing liquid (e.g., Japanese Patent Application Laid-open No. 2001-343521). According to such method, a polarizing film having a small thickness is produced. Hence, the method has attracted attention as one that can contribute to a reduction in thickness of a liquid crystal display apparatus in recent years. However, in the step of, for example, forming or processing the functional layer, there are problems such as blocking upon winding of the resin film and blocking between the resin film and the functional layer. Thus, there is a demand for an improvement in productivity.

SUMMARY OF THE INVENTION

According to an embodiment of the present invention, there is provided a resin film excellent in blocking resistance.

A resin film according to an embodiment of the present invention includes: a substrate film; and an antistatic layer formed on one side of the substrate film and including a binder resin and a conductive material. The binder resin includes a polyurethane-based resin; the antistatic layer has an arithmetic average surface roughness Ra of 10 nm or more; and the conductive material includes a conductive polymer.

In one embodiment of the present invention, the antistatic layer is subjected to a stretching treatment.

In one embodiment of the present invention, the substrate film is formed of a polyester-based resin.

In one embodiment of the present invention, the conductive polymer includes a polythiophene-based polymer.

In one embodiment of the present invention, the antistatic layer has a surface resistance value of less than $10 \times 10^{13} \Omega/\square$.

In one embodiment of the present invention, the resin film has a total light transmittance (Tt) of 89% or more.

In one embodiment of the present invention, the polyurethane-based resin has a carboxyl group.

In one embodiment of the present invention, the antistatic layer is subjected to a stretching treatment and has a surface resistance value of less than $10 \times 10^{13} \Omega/\square$, the substrate film is formed of a polyester-based resin, the conductive polymer includes a polythiophene-based polymer, the polyurethane-based resin has a carboxyl group, and the resin film has a total light transmittance (Tt) of 89% or more.

According to another aspect of the present invention, a method of producing a resin film is provided. The method includes: forming, on one side of a substrate film, an antistatic layer with a resin composition including a polyurethane-based resin and a conductive polymer; and stretching the substrate film. The antistatic layer has an arithmetic average surface roughness Ra of 10 nm or more after the stretching.

According to an embodiment of the present invention, the resin film excellent in blocking resistance can be provided by forming an antistatic layer having a specified arithmetic average roughness Ra to impart sliding property. As a result, for example, when the resin film is used as a substrate, an improvement in productivity in, for example, forming or processing a functional layer can be achieved. Further, the use of the polyurethane-based resin as the binder resin allows the effect of the antistatic property layer, that is, antistatic property to be satisfactorily retained.

DETAILED DESCRIPTION OF THE PREFERRED EMBODIMENTS

Embodiments of the present invention are described below. However, the present invention is not limited to these embodiments.

A. Resin Film

A-1. Entire Configuration

Figure 1:
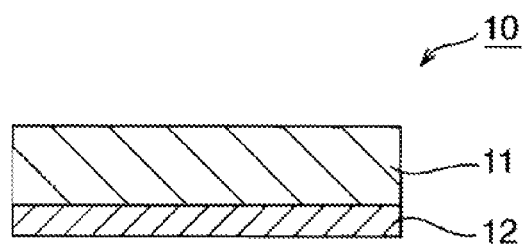
FIG. 1 is a schematic cross-sectional view of a laminate according to an embodiment of the present invention.

FIG. 1 is a schematic cross-sectional view of a resin film according to an embodiment of the present invention. A resin film 10 has a substrate film 11 and an antistatic layer 12 formed on one side of the substrate film 11. The resin film 10 is typically formed in a long shape. The thickness of the resin film may be set to any appropriate value depending on applications. The thickness is typically 5 μm to 300 μm, preferably 10 μm to 200 μm.

The resin film is preferably transparent and has a total light transmittance (Tt) of preferably 89% or more, more preferably 89.5% or more. Such excellent transparency can be satisfactorily achieved through the use of a conductive polymer as a conductive material to be described later. The respective members are described below.

A-2. Substrate Film

The substrate film is typically formed of a thermoplastic resin. Any appropriate resin is used as the thermoplastic resin depending on, for example, applications and purposes. Examples thereof include a (meth)acrylic resin, an olefin-based resin, a norbornene-based resin, and a polyester-based resin. Of those, a polyester-based resin is preferably used. This is because, when the substrate film formed of the polyester-based resin is used, for example, as a substrate for producing a polarizing film, processability can be extremely excellent. In this case, an amorphous (uncrystallized) polyethylene terephthalate-based resin is preferably used. In particular, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid component and a copolymer further containing cyclohexane dimethanol as a glycol component.

The glass transition temperature (Tg) of the substrate film may be set to any appropriate value depending on applications of the resin film. For example, when the resin film is used as a substrate for producing a polarizing film, the glass transition temperature is preferably 170° C. or less, more preferably 120° C. or less. On the other hand, the glass transition temperature of the substrate film is preferably 60° C. or more. It should be noted that the glass transition temperature (Tg) is a value to be determined according to JIS K 7121.

The thickness of the substrate film may be set to any appropriate value depending on applications. The thickness is typically 5 μm to 300 μm, preferably 10 μm to 200 μm.

The substrate film may be subjected to a surface treatment (e.g., a corona treatment) in advance. This is because the adhesiveness between the substrate film and the antistatic layer and/or a functional layer (e.g., a PVA-based resin layer) can be improved.

A-3. Antistatic Layer

The antistatic layer contains a conductive material and a binder resin, and the surface thereof has an arithmetic average roughness Ra of preferably 10 nm or more. Excellent blocking resistance can be attained by forming such antistatic layer to impart sliding property. On the other hand, the arithmetic average roughness Ra of the antistatic layer is preferably 100 nm or less. When the arithmetic average roughness Ra is more than 100 nm, for example, the optical characteristics of a finished product may be adversely affected. It should be noted that the arithmetic average roughness Ra is defined in JIS B0601.

The thickness of the antistatic layer is preferably 0.1 μm to 10 μm, more preferably 0.2 μm to 2 μm.

A coefficient of static friction between the substrate film and the antistatic layer is preferably 2.0 or less, more preferably 1.0 or less. It should be noted that the coefficient of static friction is defined in JIS K7125.

The surface resistance value of the antistatic layer (the resin film) is preferably less than $10 \times 10^{13}$ ohms per square ($\Omega/\square$), more preferably less than $10 \times 10^{11} \Omega/\square$, still more preferably less than $10 \times 10^{10} \Omega/\square$. When the surface resistance value is $10 \times 10^{13} \Omega/\square$ or more, sufficient blocking resistance and antistatic property may not be obtained.

Any appropriate conductive material may be used as the conductive material. A conductive polymer is preferably used. The use of the conductive polymer can prevent a reduction in conductivity due to stretching to be described later. Examples of the conductive polymer include a polythiophene-based polymer, a polyacetylene-based polymer, a polydiacetylene-based polymer, a polyyne-based polymer, a polyphenylene-based polymer, a polynaphthalene-based polymer, a polyfluorene-based polymer, a polyanthracene-based polymer, a polypyrene-based polymer, a polyazulene-based polymer, a polypyrrole-based polymer, a polyfuran-based polymer, a polyselenophene-based polymer, a polyisothianaphthene-based polymer, a polyoxadiazole-based polymer, a polyaniline-based polymer, a polythiazyl-based polymer, a polyphenylene vinylene-based polymer, a polythienylene vinylene-based polymer, a polyacene-based polymer, a polyphenanthrene-based polymer, and a polyperinaphthalene-based polymer. They may be used alone or in combination. Of those, a polythiophene-based polymer is preferably used. In particular, there is more preferably used a polythiophene-based polymer capable of being dissolved or dispersed into an aqueous solvent.

Specific example of the polythiophene-based polymer includes polyethylene dioxythiophene.

The content of the conductive material in the antistatic layer is preferably 1 wt % to 10 wt %, more preferably 3 wt % to 8 wt %. Further, the content of the conductive material is preferably 1 part by weight to 50 parts by weight, more preferably 2 parts by weight to 20 parts by weight, with respect to 100 parts by weight of a binder resin to be described later.

A polyurethane-based resin is preferably used as the binder resin. An antistatic layer having both of excellent adhesiveness with a substrate film and flexibility can be formed through the use of the polyurethane-based resin. Further, the arithmetic average roughness Ra can be easily achieved through the use of the polyurethane-based resin. Specifically, a coating film having a smooth surface is formed through the use of the polyurethane-based resin, and the coating film is subjected to a stretching treatment to be described later. Thus, the arithmetic average roughness Ra can be easily achieved. For example, a desired arithmetic average roughness Ra can be easily achieved by appropriately setting a stretching ratio. In addition, excellent antistatic property can be easily achieved with the arithmetic average roughness Ra.

The polyurethane-based resin refers to a resin having a urethane bond. The polyurethane-based resin includes an acrylic-polyurethane copolymer and a polyester-polyurethane copolymer. The polyurethane-based resin is typically obtained by subjecting a polyol and a polyisocyanate to a reaction. The polyol is not particularly limited as long as two or more hydroxyl groups are contained in its molecule, and any appropriate polyol may be used. Examples thereof include a polyacrylic polyol, a polyester polyol, and a polyether polyol. They may be used alone or in combination.

The polyacrylic polyol is typically obtained by copolymerizing a (meth)acrylic acid ester and a monomer having a hydroxyl group. Examples of the (meth)acrylic acid ester include methyl (meth)acrylate, butyl (meth)acrylate, 2-ethylhexyl (meth)acrylate, and cyclohexyl (meth)acrylate. Examples of the monomer having a hydroxyl group include: (meth)acrylic acid hydroxyalkyl esters such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 2-hydroxypentyl (meth) acrylate; (meth)acrylic acid monoesters of polyhydric alcohols such as glycerin and trimethylolpropane; and N-methylol(meth)acrylamide. They may be used alone or in combination.

The polyacrylic polyol may also be obtained by copolymerizing any other monomer in addition to the above-mentioned monomer components. Any appropriate monomer may be used as the other monomer as long as it is copolymerizable. Specific examples thereof include: unsaturated monocarboxylic acids such as (meth)acrylic acid; unsaturated dicarboxylic acids such as maleic acid and anhydrides, monoesters, and diesters thereof; unsaturated nitriles such as (meth)acrylonitrile; unsaturated amides such as (meth)acrylamide and N-methylol(meth)acrylamide; vinyl esters such as vinyl acetate and vinyl propionate; vinyl ethers such as methyl vinyl ether; α-olefins such as ethylene and propylene; halogenated α,β-unsaturated aliphatic monomers such as vinyl chloride and vinylidene chloride; α,β-unsaturated aromatic monomers such as styrene and α-methylstyrene. They may be used alone or in combination.

The polyester polyol is typically obtained by subjecting a polybasic acid component and a polyol component to a reaction. Examples of the polybasic acid component include: aromatic dicarboxylic acids such as orthophthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid; aliphatic dicarboxylic acids such as oxalic acid, succinic acid, malonic acid, glutaric acid, adipic acid, pimelic acid, suberic acid, azelaic acid, sebacic acid, decanedicarboxylic acid, dodecanedicarboxylic acid, octadecanedicarboxylic acid, tartaric acid, an alkylsuccinic acid, linoleic acid, maleic acid, fumaric acid, mesaconic acid, citraconic acid, and itaconic acid; alicyclic dicarboxylic acids such as hexahydrophthalic acid, tetrahydrophthalic acid, 1,3-cyclohexanedicarboxylic acid, and 1,4-cyclohexanedicarboxylic acid; and reactive derivatives thereof such as acid anhydrides, alkyl esters, and acid halides thereof. They may be used alone or in combination.

Examples of the polyol component include ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 1-methyl-1,3-butylene glycol, 2-methyl-1,3-butylene glycol, 1-methyl-1,4-pentylene glycol, 2-methyl-1,4-pentylene glycol, 1,2-dimethyl-neopentyl glycol, 2,3-dimethyl-neopentyl glycol, 1-methyl-1,5-pentylene glycol, 2-methyl-1,5-pentylene glycol, 3-methyl-1,5-pentylene glycol, 1,2-dimethylbutylene glycol, 1,3-dimethylbutylene glycol, 2,3-dimethylbutylene glycol, 1,4-dimethylbutylene glycol, diethylene glycol, triethylene glycol, polyethylene glycol, dipropylene glycol, polypropylene glycol, 1,4-cyclohexanedimethanol, 1,4-cyclohexanediol, bisphenol A, bisphenol F, hydrogenated bisphenol A, and hydrogenated bisphenol F. They may be used alone or in combination.

The polyether polyol is typically obtained by adding an alkylene oxide to a polyhydric alcohol through ring-opening polymerization. Examples of the polyhydric alcohol include ethylene glycol, diethylene glycol, propylene glycol, dipropylene glycol, glycerin, and trimethylolpropane. Examples of the alkylene oxide include ethylene oxide, propylene oxide, butylene oxide, styrene oxide, and tetrahydrofuran. They may be used alone or in combination.

Examples of the polyisocyanate include: aliphatic diisocyanates such as tetramethylene diisocyanate, dodecamethylene diisocyanate, 1,4-butane diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate; alicyclic diisocyanates such as isophorone diisocyanate, hydrogenated xylylene diisocyanate, 4,4'-cyclohexylmethane diisocyanate, 1,4-cyclohexane diisocyanate, methylcyclohexylene diisocyanate, and 1,3-bis(isocyanatomethyl)cyclohexane; aromatic diisocyanates such as tolylene diisocyanate, 2,2'-diphenylmethane diisocyanate, 2,4'-diphenylmethane diisocyanate, 4,4'-diphenylmethane diisocyanate, 4,4'-diphenyldimethylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate; and aromatic aliphatic diisocyanates such as a dialkyldiphenylmethane diisocyanate, a tetraalkyldiphenylmethane diisocyanate, and $\alpha,\alpha,\alpha',\alpha'$-tetramethylxylylene diisocyanate. They may be used alone or in combination.

The polyurethane-based resin preferably has a carboxyl group. When the resin has a carboxyl group, an antistatic layer excellent in adhesiveness with a substrate film can be obtained. The polyurethane-based resin having a carboxyl group is obtained by, for example, subjecting a chain extender having a free carboxyl group to the reaction in addition to the polyol and the polyisocyanate. Examples of the chain extender having a free carboxyl group include a dihydroxycarboxylic acid and a dihydroxysuccinic acid. Examples of the dihydroxycarboxylic acid include dialkylolalkanoic acids such as dimethylolalkanoic acids (e.g., dimethylolacetic acid, dimethylolbutanoic acid, dimethylolpropionic acid, dimethylolbutyric acid, and dimethylolpentanoic acid). They may be used alone or in combination.

In the production of the polyurethane-based resin, in addition to the above-mentioned components, any other polyol or any other chain extender may be allowed to react. Examples of the other polyol include polyols each having three or more hydroxyl groups, such as sorbitol, 1,2,3,6-hexanetetraol, 1,4-sorbitan, 1,2,4-butanetriol, 1,2,5-pentanetriol, glycerin, trimethylolethane, trimethylolpropane, and pentaerythritol. Examples of the other chain extender include: glycols such as ethylene glycol, diethylene glycol, triethylene glycol, 1,3-propanediol, 1,3-butanediol, 1,4-butanediol, neopentyl glycol, pentanediol, 1,6-hexanediol, and propylene glycol; aliphatic diamines such as ethylenediamine, propylenediamine, hexamethylenediamine, 1,4-butanediamine, and aminoethylethanolamine; alicyclic diamines such as isophoronediamine and 4,4'-dicyclohexylmethanediamine; and aromatic diamines such as xylylenediamine and tolylenediamine.

Any appropriate method is adopted as a method of producing the polyurethane-based resin. Specific examples thereof include a one-shot method involving subjecting the respective components to a reaction at a time, and a multi-stage method involving subjecting the respective components to reactions in stages. When the polyurethane-based resin has a carboxyl group, the multi-stage method is preferred because a carboxyl group can be easily introduced. It should be noted that any appropriate urethane reaction catalyst is used for producing the polyurethane-based resin.

Upon the production of the polyurethane-based resin, a neutralizing agent is preferably used. When the neutralizing agent is used, the stability of the polyurethane-based resin in water can be improved. Examples of the neutralizing agent include ammonia, N-methylmorpholine, triethylamine, dimethylethanolamine, methyldiethanolamine, triethanolamine, morpholine, tripropylamine, ethanolamine, triisopropanolamine, and 2-amino-2-methyl-1-propanol. They may be used alone or in combination.

Upon the production of the polyurethane-based resin, an organic solvent that is inert to the polyisocyanate and is compatible with water is preferably used. Examples of the organic solvent include: ester type solvents such as ethyl acetate, butyl acetate, and ethyl cellosolve acetate; ketone type solvents such as acetone, methyl ethyl ketone, and methyl isobutyl ketone; ether type solvents such as dioxane, tetrahydrofuran, and propylene glycol monomethyl ether. They may be used alone or in combination.

The polyurethane-based resin has a number average molecular weight of preferably 5,000 to 600,000, more preferably 10,000 to 400,000. The polyurethane-based resin has an acid value of preferably 10 or more, more preferably 10 to 50, particularly preferably 20 to 45. When the acid value falls within such range, adhesiveness with an optical member can be more excellent.

The content of the binder resin in the antistatic layer is preferably 50 wt % to 99 wt %, more preferably 70 wt % to 95 wt %.

The antistatic layer is typically formed by applying a resin composition containing the conductive material and the binder resin onto the substrate film and drying the composition. The resin composition is preferably aqueous. An aqueous resin composition is environmentally excellent and is also excellent in workability as compared to a solvent-based one, and hence can contribute to the simplification of a facility.

The resin composition preferably contains an anionic polymer. The anionic polymer can form a complex with the conductive material. Examples of the anionic polymer include a polycarboxylic acid and a polysulfonic acid. Specific examples of the polycarboxylic acid include polyacrylic acid, polymethacrylic acid, and polymaleic acid. Specific examples of the polysulfonic acid include polystyrene sulfonic acid.

The resin composition preferably contains a cross-linking agent. When the resin composition is cross-linked, water resistance can be imparted to an antistatic layer to be obtained. As a result, for example, the underwater stretching can be satisfactorily performed. Any appropriate cross-linking agent may be adopted as the cross-linking agent. For example, a polymer having a group capable of reacting with a carboxyl group is preferably used as the cross-linking agent. Examples of the group capable of reacting with a carboxyl group include an organic amino group, an oxazoline group, an epoxy group, and a carbodiimide group. The cross-linking agent preferably has an oxazoline group. The cross-linking agent having an oxazoline group has satisfactory workability because it has a long pot life at room temperature when mixed with the urethane resin, and a cross-linking reaction thereof progresses by heating.

Examples of the polymer include an acrylic polymer and a styrene-acrylic polymer. An acrylic polymer is preferred. When the acrylic polymer is used, the polymer can stably be compatible with the aqueous resin composition, and can be satisfactorily cross-linked with the urethane resin.

The resin composition may further contain any appropriate additive. Examples of the additive include a pH adjustor, a dispersion stabilizer, a thixotropic agent, an antioxidant, a UV absorbing agent, a antifoaming agent, a thickener, a dispersant, a surfactant, a catalyst, a filler, and a lubricant.

As mentioned above, the resin composition is preferably aqueous. The concentration of the binder resin in the resin composition is preferably 1.5 wt % to 15 wt %, more preferably 2 wt % to 10 wt %. The content of the cross-linking agent (solid content) in the resin composition is preferably 1 part by weight to 30 parts by weight, more preferably 3 parts by weight to 20 parts by weight, with respect to 100 parts by weight of the binder resin (solid content). The pH of the resin composition is adjusted to preferably 6 or more, more preferably 7 or more. As the pH adjustor, for example, ammonia is used.

Any appropriate method may be adopted as a method of applying the resin composition. Examples thereof include a bar coating method, a roll coating method, a gravure coating method, a rod coating method, a slot orifice coating method, a curtain coating method, and a fountain coating method. A drying temperature is preferably 50° C. or more, more preferably 60° C. or more. In addition, the drying temperature is preferably Tg+30° C. or less, more preferably Tg or less.

The antistatic layer is preferably subjected to a stretching treatment. The stretching treatment allows irregularities that satisfy the arithmetic average roughness Ra to be satisfactorily formed. It is preferred that the resin composition containing the conductive material and the binder resin is applied onto the substrate film, dried, and then subjected to a stretching treatment.

Any appropriate method may be adopted as a stretching method in the stretching treatment. Specifically, fixed-end stretching may be adopted, or free-end stretching may be adopted. The stretching may be performed in one stage, or may be performed in a plurality of stages. When the stretching is performed in a plurality of stages, a stretching ratio to be described later is the product of stretching ratios in the respective stages. Further, the stretching mode is not particularly limited, and may be an in-air stretching mode, or may be an underwater stretching mode.

Any appropriate direction may be selected as a stretching direction depending on applications of the resin film. The substrate film may be stretched in two or more directions. In one embodiment, a long substrate film is stretched in its lateral direction (widthwise direction). Herein, the term "lateral direction" encompasses directions at 85° to 95° counterclockwise with respect to the lengthwise direction. In another embodiment, a long substrate film is stretched in its lateral direction and longitudinal direction (lengthwise direction).

A stretching temperature may be set to any appropriate value depending on a material for forming the substrate film, a stretching mode, and the like. The stretching temperature is typically equal to or higher than the glass transition temperature (Tg) of the substrate film, and is preferably Tg+10° C. or more, more preferably Tg+20° C. or more. When an underwater stretching mode is adopted as the stretching mode and an amorphous polyethylene terephthalate-based resin is used as the material for forming the substrate film, the stretching temperature can be made lower than the glass transition temperature (e.g., 60° C. to 100° C.) of the substrate film.

A stretching ratio may be set to any appropriate value. The stretching ratio is appropriately set depending on, for example, the content of the conductive material and the coating thickness of the resin composition. The stretching ratio is preferably 1.1 times to 20 times, more preferably 1.2 times to 15 times, with respect to the original length of the substrate film.

A-4. Use Method

The resin film according to an embodiment of the present invention is suitably used as a substrate on which a functional layer is formed. For example, the resin film is used as a substrate for producing a polarizing film. In this case, the polarizing film is produced by: forming a polyvinyl alcohol (PVA)-based resin layer on the substrate film side of the resin film of the present embodiment to produce a laminate; and subjecting the PVA-based resin layer to a treatment for forming a polarizing film. The resin film of the present embodiment has excellent blocking resistance, and hence the step of, for example, attaching a protective film onto a PVA-based resin layer surface in winding a laminate can be omitted. Thus, a marked improvement in productivity can be achieved through the use of the resin film of the present embodiment.

Any appropriate resin may be adopted as the PVA-based resin for forming the PVA-based resin layer. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin may be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

The PVA-based resin layer is preferably formed by applying an application liquid containing a PVA-based resin onto the substrate film and drying the liquid. The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the substrate film can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is applied so that the thickness of the PVA-based resin layer after drying may be preferably 3 µm to 40 µm, more preferably 3 µm to 20 µm. The application liquid is preferably applied and dried at a temperature of 50° C. or more.

Examples of the treatment for forming a polarizing film include a dyeing treatment, a stretching treatment, an insolubilizing treatment, a cross-linking treatment, a washing treatment, and a drying treatment. Those treatments may be appropriately selected depending on purposes. Further, the order, timing, number of times, and the like of the treatments may be appropriately set. The respective treatments are described below.

(Dyeing Treatment)

The dyeing treatment is typically performed by dyeing the PVA-based resin layer with iodine. Specifically, the dyeing treatment is performed by causing the PVA-based resin layer to adsorb iodine. A method for the adsorption is, for example, a method involving immersing the PVA-based resin layer (laminate) in a dyeing liquid containing iodine, a method involving applying the dyeing liquid onto the PVA-based resin layer, or a method involving spraying the dyeing liquid on the PVA-based resin layer. Of those, the method involving immersing the laminate in the dyeing liquid is preferred. This is because iodine can satisfactorily adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide in order that the solubility of iodine in water may be increased. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. in order that the dissolution of the PVA-based resin may be suppressed. When the PVA-based resin layer is immersed in the dyeing liquid, an immersion time is preferably 5 seconds to 5 minutes in order that the transmittance of the PVA-based resin layer may be secured. In addition, the dyeing conditions (the concentration, the liquid temperature, and the immersion time) may be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

(Stretching Treatment)

The stretching treatment may be an underwater stretching mode, in which stretching is performed while the laminate is immersed in a stretching bath, or may be an in-air stretching mode. It is preferred that an underwater stretching treatment be performed at least once, and it is more preferred that an underwater stretching treatment and an in-air stretching treatment be performed in combination. According to the underwater stretching, the stretching can be performed at a temperature lower than the glass transition temperature (typically about 80° C.) of each of the thermoplastic substrate film and the PVA-based resin layer, and hence the PVA-based resin layer can be stretched at a high ratio while its crystallization is suppressed. As a result, a polarizing film having excellent optical characteristics (e.g., polarization degree) can be produced.

Any appropriate method may be adopted as a method of stretching the laminate. Specifically, fixed-end stretching may be adopted, or free-end stretching (e.g., a method involving passing the laminate between rolls having different peripheral speeds to uniaxially stretch the laminate) may be adopted. The stretching of the laminate may be performed in one stage, or may be performed in a plurality of stages. When the stretching is performed in a plurality of stages, the stretching ratio (maximum stretching ratio) of the laminate to be described later is the product of stretching ratios in the respective stages.

Any appropriate direction may be selected as a direction in which the laminate is stretched. In a preferred embodiment, along laminate is stretched in its lengthwise direction.

The stretching temperature of the laminate may be set to any appropriate value depending on, for example, a formation material for the substrate film and the stretching mode. When the in-air stretching mode is adopted, the stretching temperature is preferably equal to or higher than the glass transition temperature (Tg) of the substrate film, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the substrate film is preferably 60° C. or more in relation to the formation of the PVA-based resin layer. In this case, when the stretching temperature falls short of 40° C., there is a possibility that the stretching cannot be satisfactorily performed even in consideration of the plasticization of the substrate film by water. On the other hand, as the temperature of the stretching bath increases, the solubility of the PVA-based resin layer is raised and hence excellent optical characteristics may not be obtained.

When the underwater stretching mode is adopted, the laminate is preferably stretched while being immersed in an aqueous solution of boric acid (in-boric-acid-solution stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent may also be used.

The stretching bath (aqueous solution of boric acid) is preferably compounded with an iodide. Compounding the bath with the iodide can suppress the elution of iodine which the PVA-based resin layer has been caused to adsorb. Specific examples of the iodide are as described above. The concentration of the iodide is preferably 0.05 part by weight to 15 parts by weight, more preferably 0.5 part by weight to 8 parts by weight with respect to 100 parts by weight of water.

The laminate is preferably immersed in the stretching bath for a time of 15 seconds to 5 minutes.

The stretching ratio (maximum stretching ratio) of the laminate is preferably 5.0 times or more with respect to the original length of the laminate. Such high stretching ratio can be achieved by adopting, for example, the underwater stretching mode (in-boric-acid-solution stretching). It should be noted that the term "maximum stretching ratio" as used in this specification refers to a stretching ratio immediately before the rupture of the laminate. The stretching ratio at which the laminate ruptures is separately identified and a value lower than the value by 0.2 is the maximum stretching ratio.

The underwater stretching treatment is preferably performed after the dyeing treatment.

(Insolubilizing Treatment)

The insolubilizing treatment is typically performed by immersing the PVA-based resin layer in an aqueous solution of boric acid. Particularly when the underwater stretching mode is adopted, water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed after the production of the laminate and before the dyeing treatment or the underwater stretching treatment.

(Cross-Linking Treatment)

The cross-linking treatment is typically performed by immersing the PVA-based resin layer in an aqueous solution of boric acid. Water resistance can be imparted to the PVA-based resin layer by subjecting the layer to the cross-linking treatment. The concentration of the aqueous solution of boric acid is preferably 1 part by weight to 4 parts by weight with respect to 100 parts by weight of water. In addition, when the cross-linking treatment is performed after the dyeing treatment, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 50° C. The cross-linking treatment is preferably performed before the underwater stretching treatment. In a preferred embodiment, the dyeing treatment, the cross-linking treatment, and the underwater stretching treatment are performed in the stated order.

(Washing Treatment)

The washing treatment is typically performed by immersing the PVA-based resin layer in an aqueous solution of potassium iodide.

(Drying Treatment)

The drying temperature in the drying treatment is preferably 30° C. to 100° C.

The polarizing film to be obtained is substantially a PVA-based resin layer that adsorbs and orients a dichromatic substance. The thickness of the polarizing film is typically 25 μm or less, preferably 15 μm or less, more preferably 10 μm or less, still more preferably 7 μm or less, particularly preferably 5 μm or less. Meanwhile, the thickness of the polarizing film is preferably 0.5 μm or more, more preferably 1.5 μm or more. The polarizing film preferably shows absorption dichroism at any wavelength in the wavelength range of 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

A coefficient of static friction between the antistatic layer and the PVA-based resin layer is preferably 2.0 or less, more preferably 1.0 or less.

EXAMPLES

Hereinafter, the present invention is specifically described by way of examples. However, the present invention is not limited by these examples.

Example 1

A polyethylene terephthalate film (manufactured by Mitsubishi Plastics, Inc., trade name "SH046", Tg: 70° C., thickness: 200 μm) was used as a substrate film.

5.33 g of an aqueous dispersion of polyurethane having a carboxyl group (manufactured by Dai-ichi Kogyo Seiyaku Co., Ltd., trade name: SUPERFLEX 210, solid content: 33%), 0.59 g of a cross-linking agent (manufactured by NIPPON SHOKUBAI CO., LTD., trade name: EPOCROS WS-700, solid content: 250), 10.67 g of an aqueous dispersion of poly(3,4-ethylenedioxythiophene) (manufactured by Agfa, trade name: Orgacon LBS, solid content: 1.2%), 0.0356 g of aqueous ammonia having a concentration of 1%, and 23.38 g of water were mixed and stirred to yield a resin composition having a pH of 7.5.

The resultant resin composition was applied with a wire bar (#4) onto one surface of the substrate film. After that, the substrate film was placed in a hot-air drying machine (60° C.) for 3 minutes to form an antistatic layer having a thickness of 1 μm. As described above, a resin film was obtained.

The resin film thus obtained was subjected to a stretching treatment in an oven at 100° C. A stretching ratio is as described below.
(1) 1.5 times in the longitudinal direction×1.0 times in the lateral direction
(2) 1.5 times in the longitudinal direction×1.5 times in the lateral direction
(3) 2.0 times in the longitudinal direction×2.0 times in the lateral direction Comparative Example 1

A resin film having formed thereon an antistatic layer having a thickness of 1 μm was obtained in the same manner as in Example 1 except that the following resin composition was used.
(Resin Composition)
2.33 g of a polylactide resin emulsion (manufactured by MIYOSHI OIL & FAT CO., LTD., trade name: Landy PL-3000, solid content: 40%), 0.29 g of a cross-linking agent (manufactured by NIPPON SHOKUBAI CO., LTD., trade name: EPOCROS WS-700, solid content: 25%), 5.33 g of an aqueous dispersion of poly(3,4-ethylenedioxythiophene) (manufactured by Agfa, trade name: Orgacon LBS, solid content: 1.2%), 0.0178 g of aqueous ammonia having a concentration of 1%, and 12.02 g of water were mixed and stirred to yield a resin composition.

Comparative Example 2

A resin film having formed thereon an antistatic layer having a thickness of 1 μm was obtained in the same manner as in Example 1 except that the following resin composition was used.
(Resin Composition)
3.59 g of an aqueous dispersion of modified nylon (manufactured by Nagase ChemteX Corporation, trade name: Toresin FS-350E5AS, solid content: 20%), 0.59 g of a cross-linking agent (manufactured by NIPPON SHOKUBAI CO., LTD., trade name: EPOCROS WS-700, solid content: 25%), 5.33 g of an aqueous dispersion of poly(3,4-ethylenedioxythiophene) (manufactured by Agfa, trade name: Orgacon LBS, solid content: 1.2%), 0.0178 g of aqueous ammonia having a concentration of 1%, and 10.76 g of water were mixed and stirred to yield a resin composition.

Comparative Example 3

A resin film having formed thereon an antistatic layer having a thickness of 1 μm was obtained in the same manner as in Example 1 except that the following resin composition was used.
(Resin Composition)
2.67 g of an aqueous dispersion of polyurethane having a carboxyl group (manufactured by Dai-ichi Kogyo Seiyaku CO., LTD., trade name: SUPERFLEX 210, solid content: 33%), 0.29 g of a cross-linking agent (manufactured by NIPPON SHOKUBAI CO., LTD., trade name: EPOCROS WS-700, solid content: 25%), 2.67 g of carbon nanotube (manufactured by MIKUNI COLOR LTD., trade name: CNTDW-262), and 14.37 g of water were mixed and stirred to yield a resin composition.

(Evaluation)

Figure 2:
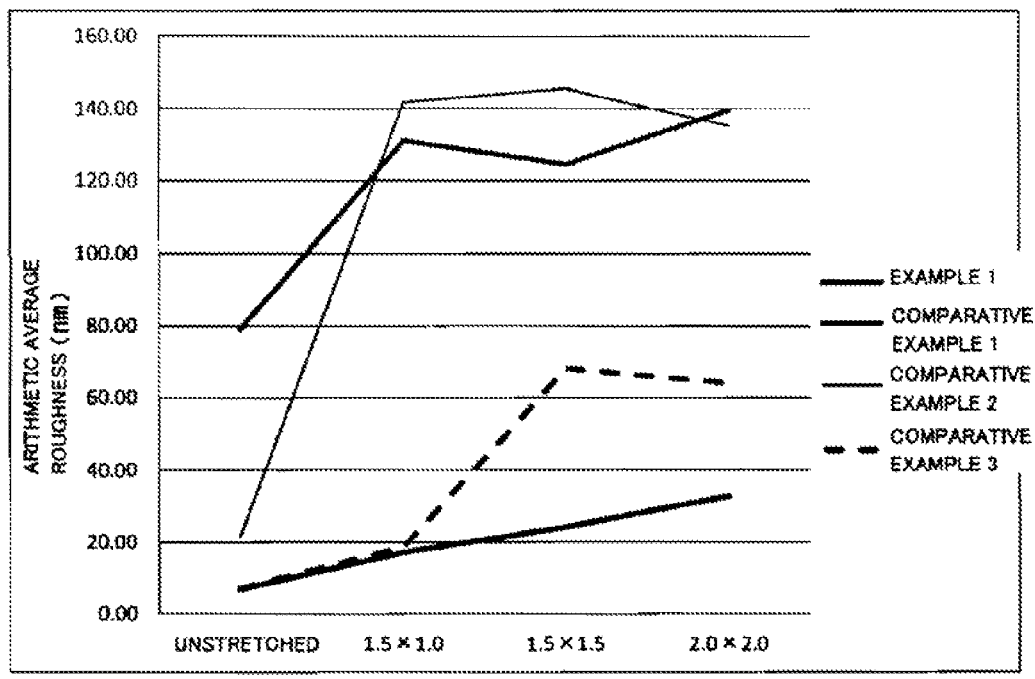
FIG. 2 is a graph showing an arithmetic average roughness (Ra) of an antistatic layer according to each of Example and Comparative Examples.

The resin film according to each of Example and Comparative Examples was subjected to the below-indicated evaluations. FIG. 2 shows the evaluation results of an arithmetic average roughness (Ra). Further, the evaluation results of an optical characteristic, the evaluation results of a coefficient of static friction (μs) with a PET film, the evaluation results of a coefficient of static friction (μs) with a PVA film, and the evaluation results of a surface resistance value are summarized in Table 1, Table 2, Table 3, and Table 4, respectively. It should be noted that the term "over" in Tables 2 and 3 means that the coefficient of static friction (μs) is more than 2.0, and the term "over" in Table 4 means that the surface resistance value is $10 \times 10^{11} \Omega/\square$ or more.

1. Arithmetic Average Roughness (Ra)

The surface of the antistatic layer was measured for its arithmetic average roughness (Ra) with Wyko (product name) manufactured by Veeco. The size of a measurement sample was set to 50 mm×50 mm.

2. Optical Characteristic

A total light transmittance (Tt) of the resin film was measured with Hitachi Spectrophotometer U-4100 (product name) manufactured by Hitachi High-Technologies Corporation. The size of a measurement sample was set to 50 mm×50 mm.

3. Coefficient of Static Friction (μs)

The resin film was measured for its coefficient of static friction (μs) based on a test method for a coefficient of friction according to JIS K7125. The size of a measurement sample was set to 150 mm×70 mm.

4. Surface Resistance Value

A surface resistance (applied voltage: 500 V, after 10 seconds) was measured with Hiresta UP MCP-HTP16 (manufactured by Mitsubishi Chemical Analytech Co., Ltd., probe: URS) under the conditions of 25° C. and 60% RH. The size of a measurement sample was set to 50 mm×50 mm.

TABLE 1

| | Stretching ratio | | | |
| --- | --- | --- | --- | --- |
| | Unstretched | 1.5 × 1.0 | 1.5 × 1.5 | 2.0 × 2.0 |
| Example 1 | 89.8 | 90.5 | 89.8 | 90.9 |
| Comparative Example 1 | 89.0 | 89.4 | 90.1 | 90.4 |
| Comparative Example 2 | 89.5 | 90.1 | 90.4 | 90.1 |
| Comparative Example 3 | 79.6 | 85.0 | 86.5 | 88.1 |

TABLE 2

| | Stretching ratio | | | |
| --- | --- | --- | --- | --- |
| | Unstretched | 1.5 × 1.0 | 1.5 × 1.5 | 2.0 × 2.0 |
| Example 1 | Over | 0.54 | 0.46 | 0.69 |
| Comparative Example 1 | 0.97 | 0.56 | 0.63 | 0.71 |
| Comparative Example 2 | 0.47 | 0.69 | 0.60 | 0.69 |
| Comparative Example 3 | Over | 0.70 | 0.53 | 0.52 |

TABLE 3

| | Stretching ratio | | | |
|---|---|---|---|---|
| | Unstretched | 1.5 × 1.0 | 1.5 × 1.5 | 2.0 × 2.0 |
| Example 1 | Over | 0.26 | 0.57 | 0.71 |
| Comparative Example 1 | 0.80 | 0.54 | 0.54 | 0.58 |
| Comparative Example 2 | 0.57 | 0.55 | 0.52 | 0.69 |
| Comparative Example 3 | 0.69 | 0.43 | 0.48 | 0.47 |

TABLE 4

| | Stretching ratio | | | |
|---|---|---|---|---|
| | Unstretched | 1.5 × 1.0 | 1.5 × 1.5 | 2.0 × 2.0 |
| Example 1 | $2.68 \times 10^9$ | $4.62 \times 10^9$ | $1.40 \times 10^{10}$ | over |
| Comparative Example 1 | $1.27 \times 10^9$ | $6.28 \times 10^9$ | over | over |
| Comparative Example 2 | $3.29 \times 10^{10}$ | $9.94 \times 10^{11}$ | over | over |
| Comparative Example 3 | $1.02 \times 10^{10}$ | Over | over | over |

In Example 1, an antistatic layer having a smooth surface was formed (before the stretching treatment), and as the stretching ratio in the stretching treatment was made larger, an antistatic layer having a larger arithmetic average roughness (Ra) was obtained.

The resin film according to Example 1 was excellent in both of blocking resistance and antistatic property, and was also excellent in optical characteristic.

The resin film of the present invention is suitably used as a substrate on which a functional layer is formed. For example, the resin film is used as a substrate for producing a polarizing film.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A resin film, comprising:
    a substrate film; and
    an antistatic layer formed on one side of the substrate film and comprising a binder resin, a cross-linking agent in an amount of 1 part by weight to 30 parts by weight with respect to 100 parts by weight of the binder resin and a conductive material,
    wherein:
    the binder resin comprises a polyurethane-based resin;
    the antistatic layer has an arithmetic average surface roughness Ra of 10 nm or more and 100 nm or less; and
    the conductive material comprises a conductive polymer
    wherein the antistatic layer is formed by applying a resin composition containing the binder resin and the cross-linking agent, and drying the resin composition.

2. A resin film according to claim 1, wherein the antistatic layer is subjected to a stretching treatment.

3. A resin film according to claim 1, wherein the substrate film is formed of a polyester-based resin.

4. A resin film according to claim 1, wherein the conductive polymer comprises a polythiophene-based polymer.

5. A resin film according to claim 1, wherein the antistatic layer has a surface resistance value of less than $10 \times 10^{13} \Omega/\square$.

6. A resin film according to claim 1, wherein the resin film has a total light transmittance (Tt) of 89% or more.

7. A resin film according to claim 1, wherein the polyurethane-based resin has a carboxyl group.

8. A resin film according to claim 1, wherein the antistatic layer is subjected to a stretching treatment and has a surface resistance value of less than $10 \times 10^{13} \Omega/\square$, the substrate film is formed of a polyester-based resin, the conductive polymer comprises a polythiophene-based polymer, the polyurethane-based resin has a carboxyl group, and the resin film has a total light transmittance (Tt) of 89% or more.

* * * * *